(12) United States Patent
Ljung

(10) Patent No.: US 11,284,471 B2
(45) Date of Patent: Mar. 22, 2022

(54) PRIORITIZING NETWORK ACCESS

(71) Applicant: Sony Corporation, Tokyo (JP)

(72) Inventor: Rickard Ljung, Helsingborg (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 154 days.

(21) Appl. No.: 16/648,815

(22) PCT Filed: Sep. 26, 2018

(86) PCT No.: PCT/EP2018/076154
§ 371 (c)(1),
(2) Date: Mar. 19, 2020

(87) PCT Pub. No.: WO2019/063632
PCT Pub. Date: Apr. 4, 2019

(65) Prior Publication Data
US 2020/0221533 A1 Jul. 9, 2020

(30) Foreign Application Priority Data
Sep. 26, 2017 (SE) .................... 1730262-1

(51) Int. Cl.
*H04W 76/34* (2018.01)
*H04W 76/15* (2018.01)
*H04W 72/04* (2009.01)

(52) U.S. Cl.
CPC ....... *H04W 76/34* (2018.02); *H04W 72/0413* (2013.01); *H04W 72/0486* (2013.01); *H04W 76/15* (2018.02)

(58) Field of Classification Search
CPC ..... H04W 76/28; H04W 76/19; H04W 80/02; H04B 7/0695; H04B 7/088; H04L 5/0091; H04L 5/0053; H04L 5/001; H04L 5/0023
See application file for complete search history.

(56) References Cited

U.S. PATENT DOCUMENTS

2006/0120321 A1  6/2006  Gerkis
2011/0292798 A1  12/2011  Manpuria
(Continued)

FOREIGN PATENT DOCUMENTS

KR  2016-0073913 A   6/2016
WO  2011100570 A1    8/2011
(Continued)

OTHER PUBLICATIONS

International Search Report and Written Opinion from corresponding International Application No. PCT/EP2018/076154, dated Dec. 21, 2018, 11 pages.
(Continued)

*Primary Examiner* — Will W Lin
(74) *Attorney, Agent, or Firm* — Tucker Ellis LLP

(57) ABSTRACT

A method includes, by using a first data connection (160) between a network (100) and a terminal (102), communicating, from a network node (112) of the network (100) to the terminal (102), a downlink control message (452) indicative of a timing (501) of a reserved resource (258) reserved for communication between the network (100) and the terminal (102). The reserved resource (258) is dimensioned based on a predicted size of a data transmission (401-403, 405-407) predicted by the network (100). The method also includes performing a connection release (453) of the first data connection (160). The method also includes, in accordance with the timing (501) and using the reserved resource (258), performing a network access (454) to establish a
(Continued)

second data connection (160) between the terminal (102) and the network (100).

20 Claims, 8 Drawing Sheets

(56) References Cited

U.S. PATENT DOCUMENTS

| | | | |
|---|---|---|---|
| 2016/0037379 A1* | 2/2016 | Shafiee | H04W 28/0268 370/230.1 |
| 2016/0105845 A1 | 4/2016 | Li | |
| 2016/0105848 A1* | 4/2016 | Li | H04L 1/08 370/329 |
| 2016/0302179 A1 | 10/2016 | Gupta | |
| 2017/0013641 A1 | 1/2017 | Patel | |
| 2017/0135134 A1* | 5/2017 | Rune | H04W 74/0833 |
| 2017/0311113 A1 | 10/2017 | Abraham | |
| 2017/0325284 A1* | 11/2017 | Pinheiro | H04W 8/22 |
| 2018/0220345 A1* | 8/2018 | Moon | H04W 36/24 |
| 2018/0368157 A1* | 12/2018 | Jeon | H04L 5/0044 |
| 2020/0296627 A1* | 9/2020 | Arvidson | H04W 28/0819 |

FOREIGN PATENT DOCUMENTS

| | | |
|---|---|---|
| WO | 2011100596 A1 | 8/2011 |
| WO | 2016056839 A1 | 4/2016 |
| WO | 2016057194 A1 | 4/2016 |
| WO | 2017015528 A1 | 1/2017 |

OTHER PUBLICATIONS

R2-1709376, "RRC connection release enhancements", 3GPP TSG-RAN WG2 Meeting #99, Berlin, Germany, Aug. 21-25, 2017, 2 pages.

* cited by examiner

PRIORITIZING NETWORK ACCESS

TECHNICAL FIELD

Various examples of the invention generally relate to communicating data between a terminal and a wireless network. Various examples of the invention specifically relate to performing network access to establish a data connection for communicating the data. According to certain examples, the network access can be prioritized.

BACKGROUND

In wireless communication systems, a terminal (sometimes also referred to as mobile device or user equipment, UE) and a base station (BS) typically communicate data using a data connection. The data connection is set up between the UE and the network using a random access procedure. This involves a network access performed by the UE. Then, resources on a spectrum can be allocated to the UE for communicating the data. This is sometimes referred to as resource scheduling. The resource scheduling is facilitated by the data connection.

According to reference implementations, the various above-identified processes from network access to resource scheduling can be energy-inefficient and may require significant time. Therefore, latency until communication of the data is increased. This may be particularly relevant for Internet of Things (IOT) devices that are to be optimized regarding energy efficient operation.

SUMMARY

A method includes communicating a downlink control message. The downlink control message is communicated using a first data connection between a network and a terminal. The downlink control message is indicative of a timing of a reserved resource. The reserved resource is reserved for communication between the network and the terminal. The reserved resource may be dimensioned based on a prediczed size of a data transmission predicted by the network, The method also includes performing a connection release of the first data connection. The method also includes performing a network access to establish a second data connection between the terminal and the network in accordance with the timing and using the reserved resource.

For example, the reserved resource may be exclusively or semi-exclusively reserved for the terminal. Hence, there may be no or reduced collision between the terminal and other terminals when the terminal accesses the reserved resource. Co-scheduling of other terminals with the terminal on the reserved resource may be avoided.

By such techniques, it is possible to facilitate timely re-connection by the terminal. This helps to reduce energy consumption, because it is possible to release the first data connection without risking increased latency when there is a need for transmitting data after the releasing of the data connection.

The timing may include scheduling information indicative of the reserved resource defined in at least one of time domain, frequency domain, and code domain.

Thereby, it is possible to dynamically schedule the establishment of the second data connection. Multiplexing in time domain, frequency domain, and code domain becomes possible.

For example, the scheduling information may be indicative of a preamble sequence for the network access.

This may help to perform multiplexing in code domain. Orthogonal preamble sequences may be used, e.g., Zadoff-Chu sequences, or Walsh-Hadamard codes.

The scheduling information may be indicative of a time-frequency resource element of a resource grid. The preamble sequence may be communicated in the time-frequency resource element. This helps to perform multiplexing in time-frequency domain. The resource element may be defined by a symbol and subcarrier of a modulation scheme.

The timing may include at least one of a sequence number of at least one transmission frame of a radio link of the network comprising the reserved resource, and a timer initialization value for a timer implemented by the terminal. This helps to schedule the reserved resource time-offset, e.g., more than 10 minutes or even more than 30 minutes from the current time. Reoccurring resources or semi-persistent scheduling may be possible employing wrap-arounds in the sequence number space.

For example, the terminal may be registered with the network as un-pageable in-between the connection release and the network access. This may help to operate the terminal in a deep-sleep mode, thereby reducing power consumption.

The terminal may be registered as un-pageable for at least 15 seconds, optionally for at least 60 seconds, further optionally for at least 10 minutes. Thereby, a large power consumption—tailored to the needs of communicating data—may be provided.

The method may further include predicting a timing of a data transmission, and determining the timing of the reserved resource based on said predicting of the timing of the data transmission, and in response to performing the network access and using the second data connection: performing the data transmission.

This may help to tailor the re-connection with the network in view of the predicted data transmission. Just-in-time delivery of the data may be provided for.

The timing of the data transmission may be predicted based on at least one of a packet data network response time and a repetitive reporting schedule of an application executed by the terminal.

This may facilitate Machine Type Communication applications.

The method may further include, using the first data connection, communicating, from the terminal to the network node, an uplink control message for requesting the downlink control message, the uplink control message being indicative of the timing of the reserved resource.

Thereby, the terminal may control the timing. This may help to facilitate just-in-time delivery of uplink data.

The downlink control message may include an acknowledgement of the timing indicated by the uplink control message. Thereby, a two-way negotiation of the reserved resource between the terminal and the network may be provided.

For example, the uplink control message may be further indicative of a size of the data transmission and optionally of a directivity of the data transmission. This may help to avoid the need for communicating an additional scheduling request for the data transmission.

The data transmission may be an uplink data transmission. The method may further include, in response to said establishing of the second data connection, communicating, from the network node to the terminal, a further downlink control message comprising scheduling information indicative of a further reserved resource. Here, the size of the further reserved resource may be in accordance with the size of the data transmission indicated by the uplink control message. The uplink data transmission may be performed using the further reserved resource.

Such techniques help to reduce the time-overhead between establishing the second data connection and performing the uplink data transmission.

The method may not include communicating an uplink scheduling request from the terminal to the network node in-between said performing of the network access and said performing of the uplink data transmission. This reduces control signaling overhead.

The downlink control message may include identity information associated with a cell of a plurality of cells of the network which reserves the resource. For example, the first data connection may be via a first cell of a plurality of cells of the network and the second data connection may be via a second cell of the plurality of cells of the network.

This helps to support terminal mobility. Inter-cell scheduling may be supported.

The method may further include, in between said performing of the connection release and said performing of the network access: continuously operating a receiver of the terminal in an inactive state.

This helps to reduce the power consumption.

The network access may be performed non-contention-based using the reserved resource.

This avoids long back-off times. Timely re-connection is facilitated.

The downlink control message may include further scheduling information indicative of a further reserved resource. The method may further include transmitting data using the second data connection and using the further reserved resource.

This helps to facilitate low-latency data transmission.

A computer program product includes program code. Executing the program code causes the at least one processor to perform a method. The method using a first data connection between a network and a terminal: communicating, from a network node of the network to the terminal, a downlink control message indicative of a timing of a reserved resource reserved for communication between the network and the terminal; and performing a connection release of the first data connection; and in accordance with the timing and using the reserved resource: performing a network access to establish a second data connection between the terminal and the network. The reserved resource may be dimensioned based on a predicted size of a data transmission predicted by the network, A computer program includes program code. Executing the program code causes the at least one processor to perform a method. The method using a first data connection between a network and a terminal: communicating, from a network node of the network to the terminal, a downlink control message indicative of a timing of a reserved resource reserved for communication between the network and the terminal; and performing a connection release of the first data connection; and in accordance with the timing and using the reserved resource: performing a network access to establish a second data connection between the terminal and the network. The reserved resource may be dimensioned based on a predicted size of a data transmission predicted by the network, A device includes control circuitry configured to perform: using a first data connection between a network and a terminal: communicating, from a network node of the network to the terminal, a downlink control message indicative of a timing of a reserved resource reserved for communication between the network and the terminal; and performing a connection release of the first data connection; and in accordance with the timing and using the reserved resource: performing a network access to establish a second data connection between the terminal and the network. The reserved resource may be dimensioned based on a predicted size of a data transmission predicted by the network, A method includes prioritizing network access of a first UE over network access of a second UE by reserving a resource for the network access for the first UE and not for the second UE. The method may further include signalling a timing of the reserved resource to the first UE. Optionally, the reserved resource itself may be signalled to the first UE, e.g., using scheduling information.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
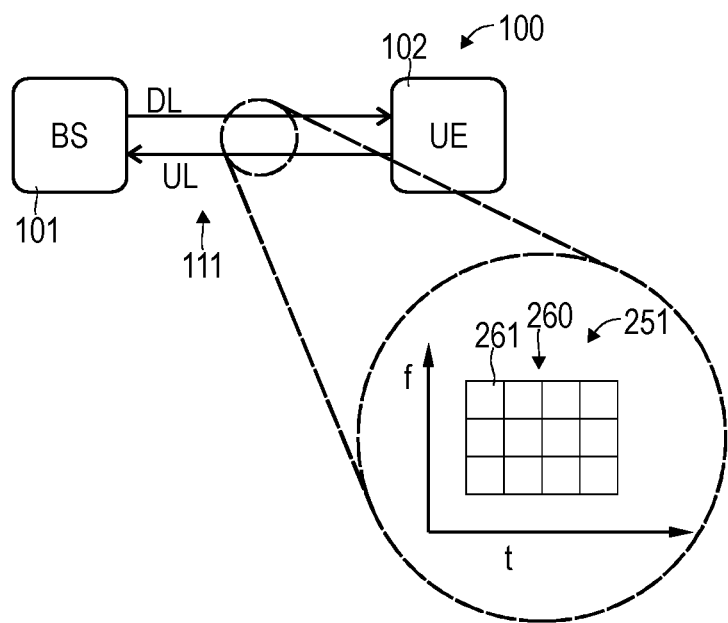
FIG. 1 schematically illustrates a BS and a UE communicating on a wireless link according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of communicating data are described. Specifically, techniques of accessing a network, e.g., in response of a need of communicating the data are described.

The techniques described herein facilitate resource-efficient and energy-efficient access to the network. The techniques described herein facilitate low-latency access to the network. This, in turn, facilitates low-latency and energy-efficient communication of the data.

The techniques described herein may be employed in connection with IOT devices. Specifically, the techniques described herein may be employed in connection with Third Generation Partnership Project (3GPP) Machine Type Communication (MTC) devices. The techniques described herein may be employed in connection with 3GPP narrowband IOT (NB-IOT) devices.

As explained above, the techniques described herein may facilitate transmitting and/or receiving (communicating) data between a UE and a BS of a network. For example, uplink (UL) data and/or downlink (DL) data may be communicated. For example, payload data that may be associated with a service executed at the UE and/or the network may be communicated. For example, payload data may be communicated between the UE and a packet data network (PDN) to which the network providing access to the UE is connected.

According to examples, a DL control message is communicated from the network to the UE. The DL control message is indicative of a timing of a reserved resource. For example, the resource may be exclusively or semi-exclusively reserved for communication between the network and the UE. The DL control message may be communicated using a first data connection between the network and the terminal. For example, a control channel such as a physical DL control channel (PDCCH) implemented by the first data connection may be used for communicating the DL control message. Then, a connection release of the first data connection may be performed. Subsequently, it is possible to perform a network access to establish a second data connection between the UE and the network, in accordance with the timing and using the reserved resource. It is then possible to communicate data using the second data connection.

As a general rule, the timing of the reserved resource for the network access may correlate or be time-aligned with the timing of the intended data transmission. For example, the timing of the reserved resource may be offset by a given amount from a timing of the data transmission, to obtain some headroom for establishing of the second data transmission.

Such techniques are based on the finding that in some scenarios it can be possible to predict a point in time at which a data connection is required for communicating the data. Then, it may be possible to provide the reserved resource for the network access such that low latency and efficient access to the network to establish the respective data connection becomes possible. Based on the network access and the established data connection, it is then possible to flexibly schedule resources for communicating the data, e.g., taking into account the size of the data, etc.

Specifically, such techniques may have certain advantages if compared to prior art implementations, e.g., according to the LoRa-alliance protocol (see www.LoRa-Alliance.org; retrieved Sep. 23, 2017). In such a solution, contention-based UL transmission is automatically followed by two short DL receive windows in which data can be received. The second receive window is only opened if data is not received within the first receive window. The delay between each receive window is fixed for each communication system and signalled by the network. Such fixed receive windows target low complexity and low energy consumption and is focused on UL-data centric IOT applications. The fixed time interval between the downlink transmission opportunities facilitates transition of the UE into an energy-saving state for the fixed time interval. However, such solutions are not very flexible. For example, if quicker response periods than the fixed time interval are required by an application relying on the communication of data, or if larger amounts of data are required then can be accommodated in the fixed-sized transmission windows, such deviations from the expected behaviour cannot be simply accounted for. Furthermore, due to the contention-based communication of the UL data, latency for communicating the UL data may increase, e.g., if the wireless link is congested.

By means of the techniques described herein, energy-efficient communication of data between the UE and the network is provided. At the same time, a larger degree of scheduling flexibility to accommodate for the above-identified limitations and drawbacks is provided for. This is achieved by setting up the data connection which facilitates flexible scheduling.

FIG. 1 schematically illustrates a wireless communication network 100 that may benefit from the techniques disclosed herein. The network 100 may be a cellular network including multiple cell, each cell associated with one or more BSs. The network may be a 3GPP-standardized network such as 3G, 4G-Long Term Evolution (LTE), or upcoming 5G-New Radio (NR). Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. For example, the UE 102 may be selected from the group including: a smartphone; a cellular phone; a table; a notebook; a computer; a smart TV; a MTC device, an IOT device; a sensor; an actuator; etc.

An MTC or IOT device is typically a device with a low to moderate requirement on data traffic volumes and loose latency requirements. Additionally, communication employing MTC or IOT devices should achieve low complexity and low costs. Further, energy consumption of an MTC or an IOT device should be comparably low in order to allow battery-powered devices to function for a comparably long duration: The battery life should be sufficiently long. For example, the IOT device may be connected to the EPS via the NB-IOT RAT.

A wireless link 111 is established between the BS 101 and the UE 102. The wireless link 111 includes a DL link from the BS 101 to the UE 102; and further includes an UL link from the UE 102 to the BS 101. Time-division duplexing (TDD), frequency-division duplexing (FDD), space-division duplexing (SDD), and/or code-division duplexing (CDD) may be employed for mitigating interference between UL and DL. T Likewise, TDD, FDD, SDD, and/or CDD may be employed for mitigating interference between multiple UEs communicating on the wireless link 111 (not shown in FIG. 1). This helps to implement non-contention-based or contention-free communication. To this end, radio resources (hereinafter, simply referred to as resources) may be used.

The inset (dashed lines) of FIG. 1 illustrates aspects with respect to the resources. Time-frequency resource elements 261 are defined in a time-frequency resource grid 251. The inset of FIG. 1 illustrates the time-frequency resource grid 251 for a single transmission frame 260. The transmission frames 260 structure transmission on the wireless link 111 in time domain. Examples of transmission frames 260 include subframes, frames, and superframes, in hierarchical order.

In the example of FIG. 1, each time-frequency resource 261 may be formed by a subcarrier of a Orthogonal Frequency Division Multiplexing (ODFM) modulation scheme. Each time-frequency resource elements 261 may carry a single symbol in time domain. Each time-frequency resource element 261 may be reserved for communication between the BS 101 and a given UE. Such time-frequency resource elements are sometimes also referred to as dedicated resources. For reservation, scheduling information may be provided by the BS 101 to the respective UE.

Some of the time-frequency resources 261 may not be reserved for communication between the BS 101 and the given UE; rather, contention-based access to the network may be implemented based on such shared resources where UEs have not had a chance to receive scheduling information.

While in FIG. 1 TDD and FDD in connection with time-frequency resource elements 261 has been explained, in other examples it would be possible to employ CDD and/or SDD for implementing non-contention-based communication, thus relying on resources defined in at least one of space domain or code domain.

Figure 2:
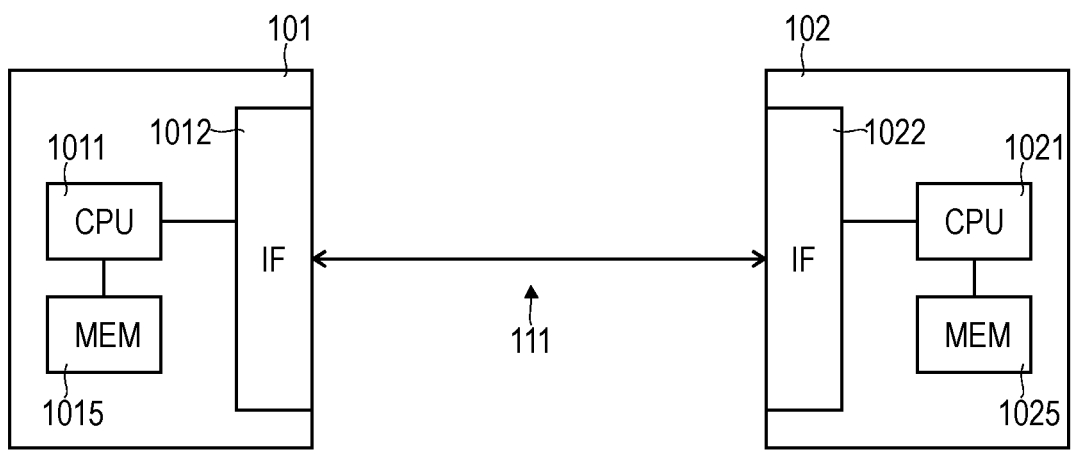
FIG. 2 schematically illustrates the UE and the PS in greater detail according to various examples.

FIG. 2 schematically illustrates the BS 101 and the UE 102 in greater detail. The BS 101 includes a processor 1011 and an interface 1012. The interface 1012 may include one or more antennas. The interface 102 may be configured to communicate on the wireless link 111. The BS 101 further includes a memory 1015, e.g., a non-volatile memory. The memory may store program code that can be executed by the processor 1011. Executing the program code may cause the processor 1011 to perform techniques with respect to: participating in a RA procedure with the UE 102;

participating in a network access of the UE 102; prioritizing network access by the UE 102 over network access of a further UE; allocating a reserved resource for the network access by the UE 102; performing FDD, TDD, SDD, and/or CDD to provide the reserved resource; transmitting, to the UE 102, a DL control message which is indicative of the timing of a reserved resource; etc. Thus, the processor 1011 and the memory 1015 form a control circuitry.

The UE 102 includes a processor 1021 and an interface 1022. The interface 1022 may include one or more antennas. The interface 1022 may be configured to communicate on the wireless link 111. The UE 102 further includes a memory 1025, e.g., a non-volatile memory. The memory 1025 may store program code that can be executed by the processor 1021. Executing the program code may cause the processor 1021 to perform techniques with respect to: participating in a RA procedure with the BS 101; performing a network access to the network via the BS 101; receiving, from the BS 101, a DL control message which is indicative of the timing of at least one reserved resource; etc. Thus, the processor 1021 and the memory 1025 form a control circuitry.

Figure 3:
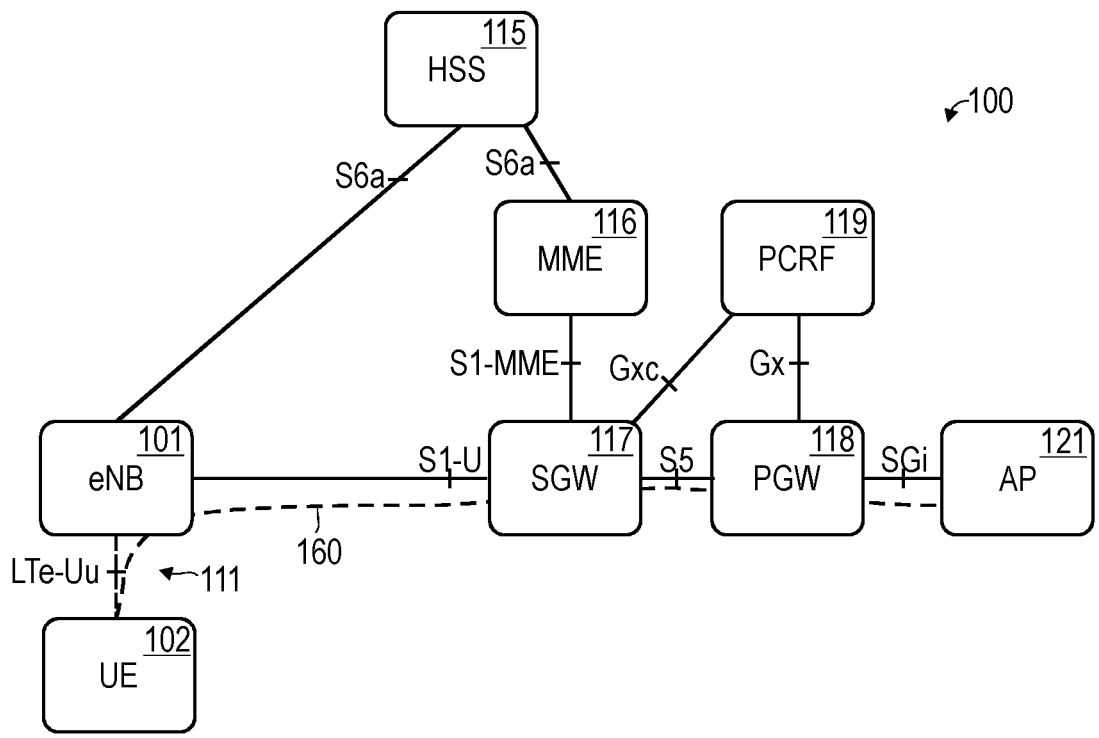
FIG. 3 schematically illustrates the architecture of a network including the BS according to various examples.

FIG. 3 illustrates aspects with respect to the architecture of a cellular network 100 according to some examples implementations. In particular, the cellular network 100 according to the example of FIG. 3 implements the 3GPP LTE architecture, sometimes referred to as evolved packet system (EPS). This, however, is for exemplary purposes only. In particular, various scenarios will be explained in the context of the wireless link 111 between the UE 102 and the BS 102 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. The network 100 may be operating according to the 3GPP NR protocol. A further particular example is the 3GPP NB-IOT RAT. The 3GPP NB-IOT RAT may be based on the 3GPP LTE RAT, i.e., the Evolved UMTS Terrestrial Radio Access (E-UTRA). Further, the NB-IOT RAT may be combined with the EPS as illustrated in FIG. 3. The various examples disclosed herein may be readily implemented for the 3GPP NB-10T RAT, alternatively or additionally. Similarly, the techniques described herein may be employed for MTC. Other examples include other types of networks, e.g., Institute of Electrical and Electronics Engineers (IEEE) 802.11X Wireless Local Area Network, Bluetooth or Zigbee.

The UE 102 is registered to the network 100. In the example of FIG. 3, the UE 102 is connected to the network 100 via the wireless link 111 to a BS 101 of the cellular network 100. The BS 101 and the UE 102 implement the evolved UMTS terrestrial radio access technology (E-UTRAN); therefore, the BS 101 is labeled evolved node B (eNB) in FIG. 3. In NR, the BS 101 is known as g Node B (gNB). In other examples, the UE 102 may be registered to the network 100, but no active data connection 160 may be maintained. To set-up the connection 160, a network access including a contention-based or non-contention-based random access (RA) procedure may be performed by the UE 102 and the BS 101.

Communication on the wireless link 111 can be in UL and/or DL direction. The BS 101 is connected with a gateway node implemented by a serving Gateway (SGW) 117. The SGW 117 may route and forward payload data and may act as a mobility anchor during handovers of the UE 102.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 3): for this purpose, the PGW 118 is connected with an access point node 121 of the packet data network. The access point node 121 is uniquely identified by an access point name (APN). The APN is used by the UE 102 to seek access to the PDN.

In a 3GPP NR scenario, the SGW 117 and PGW 117 functionality may be implemented by a user plane function (UPF).

The PGW 118 can be an endpoint of an end-to-end data connection 160 for packetized payload data of the UE 102. The data connection 160 may be used for communicating payload data of a particular application. Different applications/services may use different data connections 160 or may share, at least partly, a certain data connection. The data connection 160 may be implemented by one or more bearers which are used to communicate service-specific data. An EPS bearer which is characterized by a certain set of quality of service parameters indicated by the QoS class identifier (QCI). The data connection may be, at least partly, defined on a Layer 2 or Layer 3 of a transmission protocol stack implemented by the BS 101 and the UE 102 for communicating on the wireless link 111. For example, in connection with the 3GPP LTE E-UTRAN, the data connection 160 may be implemented on the Radio Resource Control (RRC) layer.

A control layer of the core network includes a mobility management entity (MME) 116. The MME 116 functionality may be implemented by a Access and Mobility Management Function (AMF) and the Session Management Function (SMF) in a 3GPP NR framework.

A home subscriber server (HSS) 115 includes a repository that contains user- and subscriber-related information such as authentication and subscription information. In 3GPP NR, such functionality may be implemented by the Authentication Server Function (AUSF) and/or the Unified Data Management (UDM) functionality.

A Policy and Charging Rules Function (PCRF) implements policy control to thereby facilitate a certain QoS. The respective function is implemented by the Policy Control Function (PCF) in the 3GPP NR framework.

The MME 116 handles mobility and security tasks such as paging and access credentials. The MME 116 also keeps track of the operational mode of the UE 102, e.g., whether the UE 102 operates in connected or disconnected mode. The MME 116 is the termination point of the non-access stratum (NAS) connection, i.e., a control connection implemented on the layer above the RRC layer.

Figure 4:
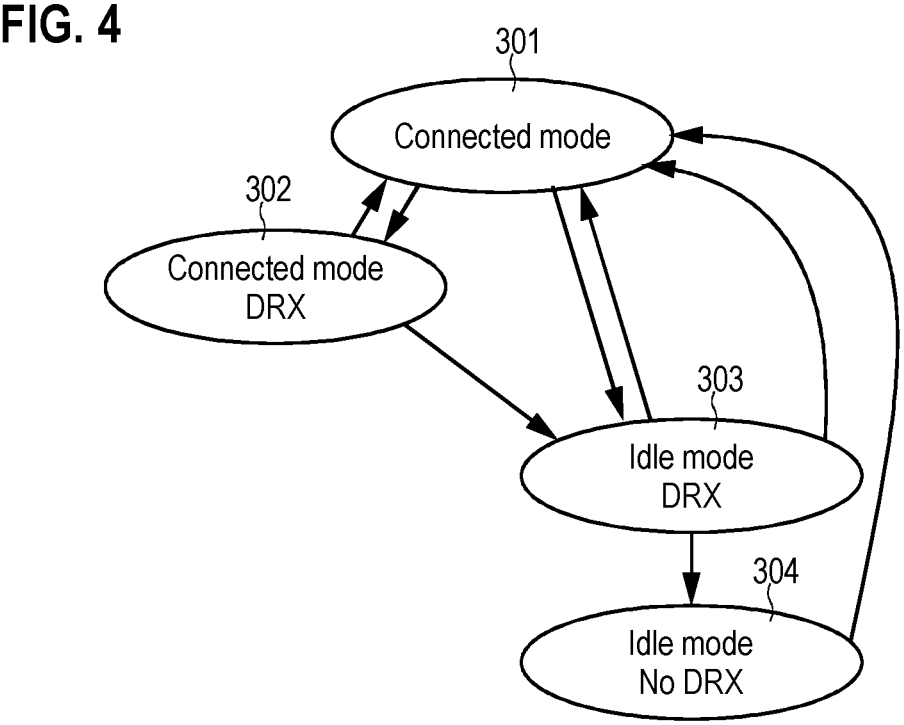
FIG. 4 schematically illustrates various operational modes of a UE according to various examples.

The MME 116 may control paging functionality. Hence, there may be a registry maintained by the MME 116 which identifies whether a certain UE is pageable or un-pageable. This may depend on the particular operational mode of that UE. The operational mode, in turn, may be associated with the presence or absence of the data connection 160. FIG. 4 illustrates aspects in connection with such operational modes.

FIG. 4 illustrates aspects with respect to different operational modes 301-304 in which the UE 102 can operate. In all states illustrated in FIG. 4, the UE 102 may be registered with the network 100, i.e., may be EMM-REGISTERED in 3GPP LTE or MM-REGISTERED in 3GPP NR. Thus, a corresponding entry may be kept at the MME 116.

In connected mode 301, the data connection 160 is set up. For example, a default bearer and optionally one or more dedicated bearers may be set up between the UE 102 and the network 100.

In order to reduce the power consumption, it is then possible to transition from the connected mode 301 to a connected mode 302 which employs a discontinuous reception (DRX) cycle (Connected mode DRX).

The DRX cycle includes on durations and off durations (not illustrated in FIG. 4). During the off durations, an interface of the UE 102 is unfit to receive data; e.g., an analog and/or digital frontend may at least be partially powered down. The timing of the DRX cycle is synchronized between the UE 102 and the BS 101 such that the BS 101 can align any DL transmission with the on durations of the connected mode DRX cycle. The data connection 160 is maintained established in mode 302 even during the off durations. The data connection 160 is not released.

To achieve a further power reduction, it is possible to transition into one or more disconnected modes 303, 304. Here, the data connection 160 is released and not set up.

One example of a disconnected mode 303, 304 is the idle mode 303. The idle mode 303 is, again, associated with an idle mode DRX cycle of the UE 102. However, during the on durations of the DRX cycle in idle mode 303, the interface of the UE 102 is only fit to receive paging. For example, this may help to restrict the frequency bandwidth that needs to be monitored by the UE during the on durations of the DRX cycles in idle mode 303. This may help to further reduce the power consumption—e.g., if compared to the connected mode 302.

For example, when transitioning from the connected mode 301 to the idle mode 303, it would be possible to release the data connection 160. The UE 102 may automatically transition from idle mode 303 to the connected mode 301 in accordance with timing information previously provided by the network 100. This may include network access on reserved resources.

A further example of a disconnected mode is the idle mode without DRX. Here, the interface 1022 of the UE 102 is continuously operated in a sleep state. Hence, the UE 102 is registered with the network 100 as being un-pageable. A DRX cycle is not implemented. The UE 102 may automatically transition from idle mode 304 to the connected mode 301 in accordance with timing information previously provided by the network 100. This may include network access on reserved resources. The mode 304 provides for a particular large energy saving. Specifically, it may not be required to repetitively operate the receiver in an active state to facilitate paging.

FIG. 4 is an example scenario only. In other examples fewer, more, or different modes may be used. For example, in the 3GPP NR context, a RRC-INACTIVE CONNECTED mode may be used, see 3GPP (Technical Report) TR 23.799, Study on Architecture for Next Generation System, V.1.2.1 (November 2016). Here, the UE keeps parts of the RAN context; these parts remain valid when re-connecting to the network. Such parts may include the Access Stratum (AS) security context, UE capability information, etc.

Figure 5:
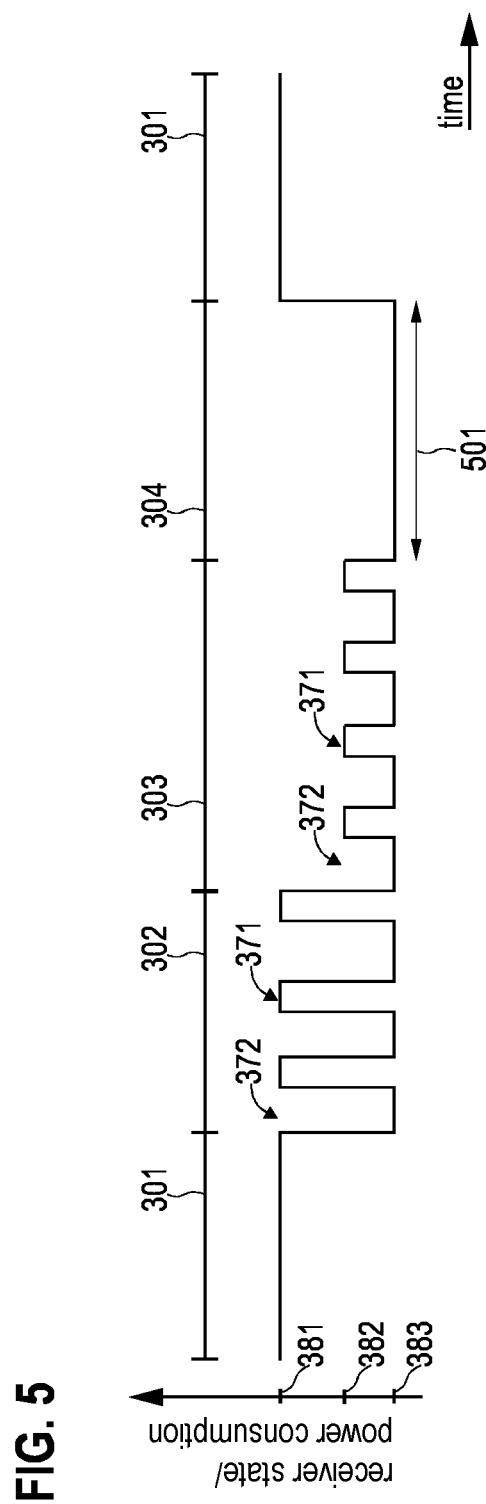
FIG. 5 schematically illustrates operation of a receiver of the UE in different states according to the operational modes of the UE and further according to various examples.

FIG. 5 illustrates aspects with respect to transitioning between the different modes 301-304.

First, the UE 102 operates in the connected mode 301. This causes a persistent power consumption at a high level. The interface 1022 of the UE 102 is in an active state 381. The data connection 160 is established and may be used for communicating control data or payload data.

Then, in order to reduce the power consumption, the connected mode 302 employing DRX is activated. Here, the on durations 371 and the off durations 372 of the DRX cycle are illustrated. During the off durations 372, the interface 130 is in an inactivate state 383 in which it is unfit to receive signals and to transmit signals. The inactive state 383 is associated with a low energy consumption. In connected mode 302, the data connection 160 is established and may be used for communicating control data or payload data.

To further reduce the power consumption, next, the idle mode 303 is activated. This is accompanied by performing a connection release of the data connection 160. Again, the idle mode 303 employs a DRX cycle including on durations 371 and off durations 372. The on durations 371 in idle mode 303 are associated with a lower power consumption if compared to the on durations 371 in connected mode 302, because in the idle mode 303, the capability of the interface can be reduced if compared to the connected mode 302. Thus the interface of the UE 102 operates in a power-save state 382 during the on durations 371. During idle mode 303, the receiver of the interface may only expect reception of paging signals. This may help to restrict the bandwidth and/or restrict the need for complex demodulation functionality. During the off durations 372 of the idle mode 303, the UE 102 is un-pageable. In some scenarios, the off durations 372 may have a comparably long duration, e.g., in the order of minutes or even hours. For example, the duration of each of duration 372 may not be smaller than 20 minutes, optionally not smaller than 50 minutes.

Finally, the UE 102 is operated in the idle mode 304. Here, the interface 1022 of the UE 102 is continuously and contiguously operated in the inactive state 383. Hence, the UE 102 cannot be paged. Consistently, the UE 102 may be registered at the network 100 as being un-pageable. In accordance with a predefined timing 501, the UE 102 then transitions again to the connected mode 301. This includes a network access.

While in FIG. 5 a scenarios illustrated where the UE 102 transitions to the connected mode 301 in accordance with the timing 501, in other scenarios, it would also be possible that the UE 102 transitions into another mode in accordance with the timing 501, e.g., into the mode 302 or 303.

Further, while in FIG. 5 a scenario is illustrated where the UE 102 transitions to the idle mode 304 via modes 302, 303, in other scenarios a direct transition from connected mode 301 to idle mode 304 would be possible.

Figure 6:
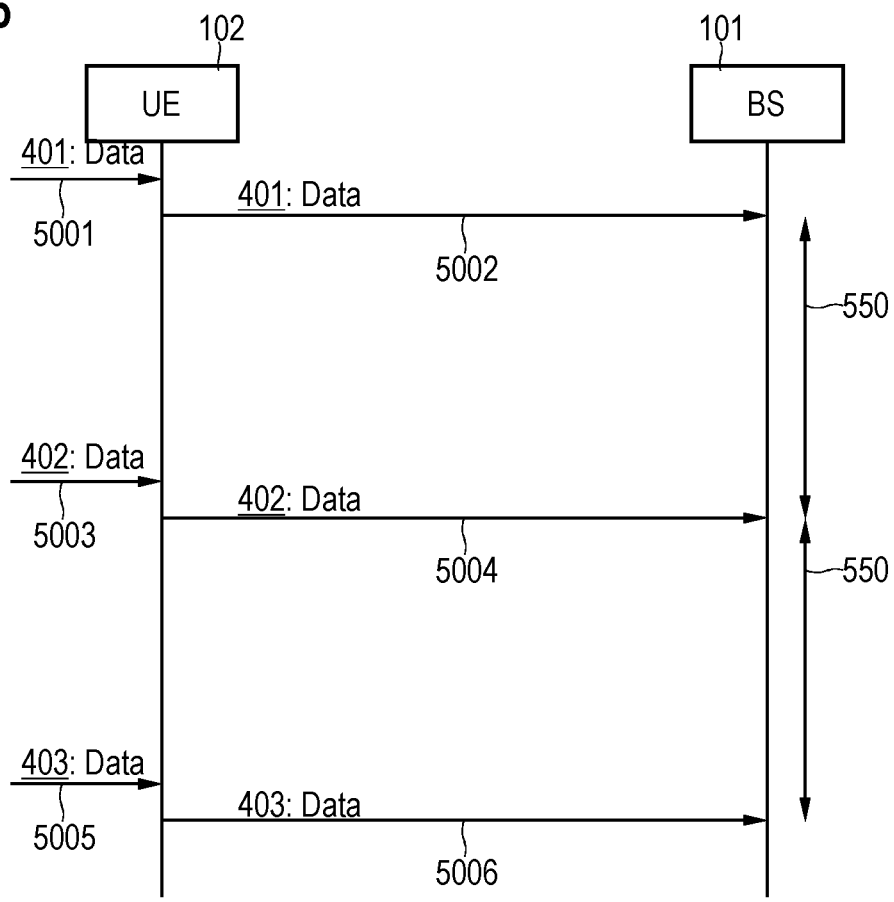
FIG. 6 is a signalling diagram of communication between the UE and the BS according to a repetitive reporting schedule of an IOT application executed by the UE according to various examples.

FIG. 6 is a signaling diagram of communicating data 401 between the UE 102 and the BS 101. While in the example of FIG. 6 a scenarios illustrated where UL data 401 is communicated from the UE 102 to the BS 101, similar scenarios may also be applicable for communication of DL data from the BS 101 to the UE 102.

FIG. 6 illustrates aspects with respect to communicating UL data 401. Specifically, FIG. 6 illustrates aspects with respect to communicating UL data 401 in accordance with a certain timing 550. The timing may be associate with a repetitive reporting schedule of an application executed by the UE 102.

Initially, at 5001, data 401 arrives at in UL transmit buffer of the UE 102. For example, the data 401 may be provided by an application implemented by the UE 102. Then, at 5002, the data 401 is transmitted by the UE 102 and subsequently received by the BS 101.

This is repeated at 5003, 5004 and 5005, 5006, respectively. As will be appreciated from FIG. 6, the application providing the data 401 provides the data according to a certain re-occurring timing 550. For example, the timing 550 may define a periodicity. However, a strict periodicity is not required. In any case, there may be some a priori knowledge on the timing 550 with which the data 401 arrives at the UL transmit buffer of the UE 102.

An example scenario where such a priori knowledge on the timing 550 is available may relate to an IOT application. For example, the IOT application may implement some reporting of sensor data of a sensor of the UE 102. The sending may be implemented in accordance with a repetitive reporting schedule which defines the timing 550. For example, in such a scenario, the timing 550 may be defined by a temporal resolution of the sending of the sensor of the UE 102.

Figure 7:
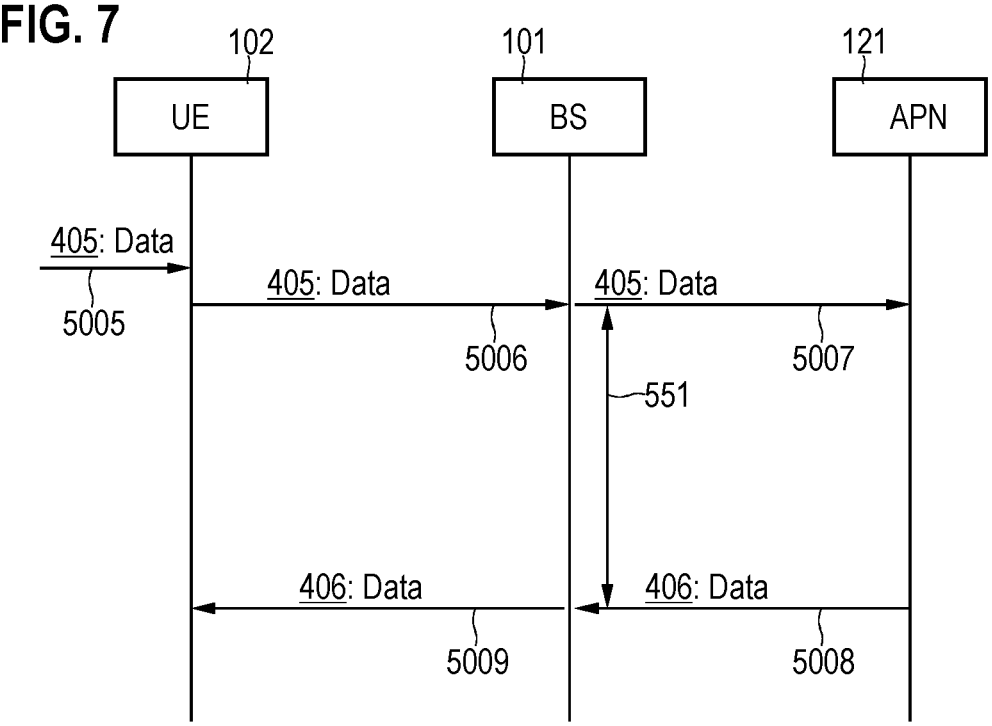
FIG. 7 is a signalling diagram of communication between the UE and the BS and illustrates a round-trip time of data communicated between the UE and a server of a packet data network according to various examples.

FIG. 7 illustrates aspects with respect to communicating UL data 405 and DL data 406. The DL data 406 is associated with the UL data 405, e.g., as a request-response pair. For example, both, the UL data 405, as well as the DL data 406 may relate to one and the same application implemented by the UE 102. Specifically, FIG. 7 illustrates aspects with respect to communicating the data 405, 406 in accordance with a certain timing 551.

Initially, at 5005, data 405 arrives at an UL transmit buffer of the UE 102. For example, the data 405 may be provided by an application implemented by the UE 102. Then, at 5006, the data 405 is transmitted by the UE 102 and subsequently received by the BS 101. The BS 101, at 5007, forwards the data 405 to the APN 121, along the data connection 160. An intended recipient of the data 405 may be a server of the PDN to which the access point node 121 is connected.

Again, there is a priori knowledge on a timing 551 of response data 406 triggered by the data 405. The data 406 is received by the BS 101 from the APN 121 at 5008 and, subsequently, forwarded to the UE 102 at 5009. The timing 551 may be predictable based on a round trip time and/or latency of communication between the network 100 and the PDN which hosts the server to which the data 405 is directed and from which the data 406 originates. Hence, the timing 551 may be estimated on the response time of PDN.

A typical timescale of the timings 550, 551 in scenarios is illustrated in FIGS. 6 and 7 may be in the order of a couple of seconds, tens of seconds, or even minutes. For example, various IOT applications may provide measurement reports every 10 minutes or every one hour, et cetera. Typically, round-trip times 551 can be in the order of seconds, e.g., if some processing delay associated with a transaction included in the data 405 is required.

In the scenarios of FIGS. 6 and 7, the data 401-403, 405-406 may be communicated using the data connection 160. Hereinafter, techniques are described which facilitate timely or just-in-time release and re-establishing of the data connection 164 communicating the data 401-403, 405-406, specifically taking into account the a priori knowledge on the timing 550, 551. This is achieved by prioritizing network access by the UE 102 for re-establishing the data connection after connection release. An example technique is illustrated in connection with FIG. 8.

Figure 8:
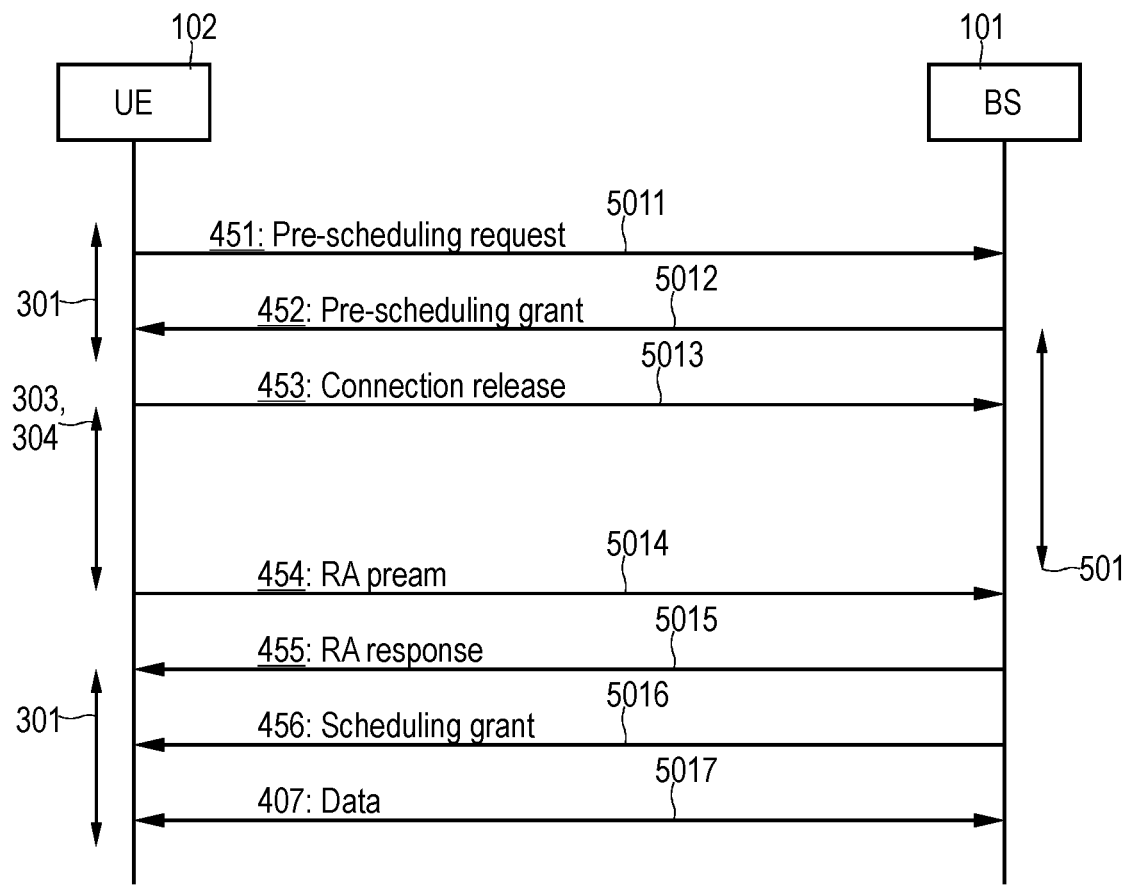
FIG. 8 is a signalling diagram of communication between the UE and the BS and illustrates using reserved resources for performing a network access prior to communicating data according to various examples.

FIG. 8 is a signaling diagram of communicating between the UE 102 and the BS 101. FIG. 8 illustrates aspects in connection with prioritizing network access by the UE 102. The scenario of FIG. 8 could be used to facilitate data transmission as illustrated above in connection with FIGS. 6 and 7.

At 5011, and UL control message 451 (labeled pre-scheduling request in FIG. 8) is transmitted by the UE 102 and subsequently received by the BS 101. The UL control message 451 is for requesting a subsequent DL control message 452 (labeled pre-scheduling grant in FIG. 8). Generally, the UL control message 451 is optional.

At 5012, the DL control message 452 is transmitted by the BS 101 and subsequently received by the UE 102.

In the scenario FIG. 8, the control messages 451, 452 are communicated using an existing data connection 160. As illustrated in FIG. 8, the UE 102 is operated in connected mode 301 when communicating the control messages 451, 452. For example, the control messages 451, 452 may be communicated using the Physical UL Control Channel (PUCCH) and the PDCCH, respectively.

The DL control message 452 is indicative of a timing 501. The timing 501 is associated with one or more resources reserved for the UE 102 for network access 454 at 5014 after connection release 453 of the data connection at 5013. By reserving resources for network access, the network access by the UE 102 can be prioritized.

The resource is reserved such that the network access 454—and with it the establishing of the data connection 160—is performed just-in-time, to facilitate subsequent data transmission 407 at 5017. This enables the UE 102 to reduce energy consumption in the meantime: The timing 501 facilitates the connection release 453 at 5013. Thus, the UE 102 may transition into idle mode 303 or idle mode 304. This reduces the energy consumption.

The timing 501 may be set based on a priori knowledge on the point in time at which communication of data 407 is predicted. For example, the timing 501 may be determined in accordance with the predicted timing 550 as illustrated in connection with the scenario FIG. 6, or may be determined in accordance with the predicted timing 551 as illustrated in connection with the scenario FIG. 7. Hence, the UE 102 may then be operated in idle mode 303, 304—at which it may or may not be registered as being un-pageable—for at least 15 seconds, optionally at least 60 seconds, further optionally for at least 10 minutes. This facilitates continuously operating the receiver of the UE 102 in the inactive state 383, thereby saving energy.

Depending on the particular scenario, it would be possible that the UL control message 451 is indicative of the timing 501; such a scenario may in particular apply where the point in time at which the data 407 is expected is governed by UE-centric processes such as a reporting schedule of an IOT application. If the UL control message 541 is already indicative of the timing 501, then the DL control message 542 may positively acknowledge or negatively acknowledge the timing 501 proposed by the UL control message 541. If, however, the UL control message 542 is not indicative of the timing 501, then the DL control message 542 may include an indicator indicative of the timing 501: for example, the DL control message 542 may include the indicator which includes at least one of the sequence number of a transmission frame 260 of the radio link 111 or a timer initialization value of a timer implemented at the UE 102.

For example, it may then be possible to monitor the sequence numbers of the transmission frame from a broadcasted signal, e.g., information blocks. Then, based on the timing 501, the UE 102 may wait for next activity synchronized with the broadcasted sequence number.

In accordance with the timing 501, the UE 102 performs a network access 453 to establish the previously released data connection 160 with the network 100, 5014. Specifically, at 5014, the UE 102 transmits a random access preamble, sometimes also referred to as random access (RA) message 1. Then, at 5015, the BS 101 transmits a RA response message 455, sometimes also referred to as RA message 2.

A setup of the data connection 160 may be achieved by the network access 453 and, optionally, subsequent RRC control signaling (not illustrated in FIG. 8).

At 5016, the BS transmits a scheduling grant 456 which include scheduling information for the subsequent data transmission 407, e.g., UL data and/or DL data.

To prioritize the network access by the UE 102 at 5014, the timing 501 may be associated with one or more resources 261 reserved on the radio link 111 for communicating the preamble 455. This is illustrated in greater detail in connection with FIG. 9.

Figure 9:
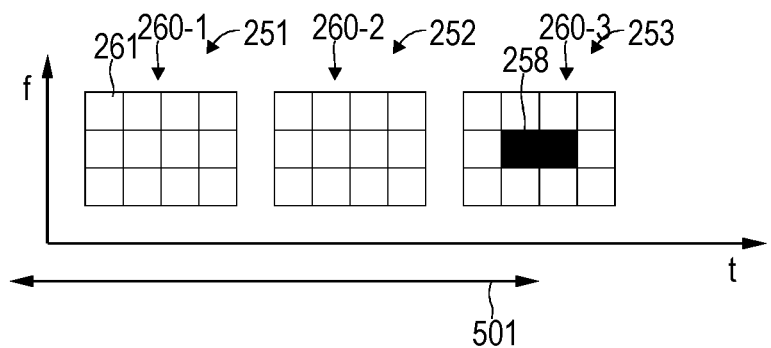
FIG. 9 schematically illustrates reserved resources for performing a network access according to various examples.

FIG. 9 schematically illustrates aspects with respect to the timing 501 of a reserved resource 258. In particular, in the scenario of FIG. 8, the timing 501 may include a sequence number of the transmission frame 263 which includes the reserved resources 258. In the scenario FIG. 8, the reserved resources are defined in time domain and frequency domain: specifically, the reserved resources include two time-frequency resource elements 258 that are exclusively allocated for use by the UE 102. Hence, the reserved resources are dedicated to the UE 102. When the UE 102 attempts to transmit the preamble as part of the network access 454 using the reserved time-frequency resource elements 258, crosstalk or interference with further UEs may be mitigated. For example, the BS 101 may not schedule any further UEs for transmitting on the reserved time-frequency resource elements 258.

While in the scenario of FIG. 8 a scenario has been illustrated in which the reserved resources 258 are defined in time domain and frequency domain, in other examples, the reserved resources may be defined in either one of time domain or frequency domain. Further, alternatively or additionally to defining the reserved resources 258 in time domain and/or frequency domain, the reserved resources may be defined in code domain or space domain: An example scenario of reserving resources in code domain includes selecting the preamble used for network access 454 from a set of candidate preambles. Different candidate preambles may be orthogonal with respect to each other in code domain. Then, by reserving certain candidate preambles for exclusive or semi-exclusive use by the UE 102, crosstalk or interference with further UEs can be mitigated. In spatial domain, beamforming using antenna arrays may be used.

Generally, by using the reserved resources, the network access 454 can be implemented non-contention-based. This is, in particular, different to an implementation where a contention-based access procedure is used which is based on non-reserved resources: time-frequency resource elements of a contention-based access procedure are typically announced using an information block broadcasted by the BS 101 and may be used by any UE attempting to perform the network access. Similar, a preamble may be selected by two or more UEs contemporaneously. Therefore, in a contention-based access procedure, collision can occur. Then, typically, a random back-off is implemented which increases energy consumption and latency period. By means of the reserved resources, a non-contention-based RA procedure becomes possible where collision is fully avoided or, at least, the likelihood of collision is significantly reduced if compared to a contention-based RA procedure.

As a general rule, the reserved resources may be exclusively or, at least, semi-exclusively reserved for use by the UE 102. For example, it would be possible that one or more candidate preambles are reserved for a subset of all UEs. Then, such semi-exclusively reserved resources may already reduce crosstalk or interference to a certain degree. In yet another scenario, the timing 501 may be indicative of a plurality of reserved resources and the UE may have some flexibility with respect to using only a subset of the reserved resources. Then, by semi-exclusively reserving the resources to a subset of all UEs, spectral efficiency can be increased. There may be some reuse of the semi-exclusively reserved resources between multiple UEs.

The DL control message 452 may, in some examples, not specify the exact reserved resources. Rather, the timing 501 indicated by the DL control message 452 may specify a point in time at which the reserved resources occur—e.g., based on the sequence number of the respective transmission frame 260 and/or based on the timer initialization value, as described above. Then, the specific reserved resource to be used by the UE 102 may be predefined, e.g., according to a fixed rule set. For example, certain time-frequency resource elements 258 re-occurring in each transmission frame 260—

1-260-3 may be fixedly associated with such prioritized network access. Then, the UE 102 may conclude which specific resource elements 258 to use, based on, both, the timing 501 indicated by the DL control message 452, as well as the fixed rule set. Similar considerations may apply where the UE is given access to more than one prioritized candidate preamble sequence in code domain and the specific choice is performed by the UE 102.

In a further example, the DL control message 452 may specify the exact reserved resources. Here, the DL control message 452 may include the timing which may be implemented by the scheduling information indicative of the reserved resource defined in at least one of time domain, frequency domain, and code domain. For example, the scheduling information could be indicative of the preamble sequence for the network access. It would also be possible that the scheduling information is indicative of a time-frequency resource element of the resource grid 253. Then, the preamble sequence can be communicated in the time-frequency resource element indicated by the scheduling information.

In any case, by providing the reserved resource 258, the prioritization of the network access at 5014 can be achieved. By such prioritization of the network access at 5014, time-consuming backoff procedures otherwise encountered for contention-based network access can be avoided. This also reduces energy consumption and latency associated with communicating the data 407 at 5017.

Again referring to FIG. 8: Techniques are available for further reducing energy consumption and latency associated with communicating the data 407 at 517. Namely, in some scenarios, it may not only be possible to predict the point in time at which the data 407 is to be communicated and, based on this prediction, determine the timing 501. There are also scenarios conceivable in which the size of the data 407 to be communicated may be predicted. For example, the data 407 may be predicted based on historic information on comparable data that has been previously communicated.

Then, if such information on the predicted size of the data 407 is available, it would be possible that the scheduling grant 456 communicated at 5016 as a further DL control message is based on this predicted size. Specifically, the resources allocated to the UE 102 for communicating the data 407 by means of the scheduling grant 456 may be dimensioned based on the predicted size of the data 407. In other terms, the reserved resource 258 is dimensioned based on a predicted size of the data 407 transmission predicted by the network 100. Then, it is not required that the UE 102 transmits a scheduling request to the BS 101 prior to communicating the data 407 at 5017 and after the network access at 5014.

In some examples, it would be possible that the UL control message 451 communicated at 5011 this indicative of the size of the data 407. Such a scenario may, in particular, apply where the data 407 is UL data. As such, it would be possible that the UL control message 451 is also indicative of the directivity of the transmission of the data 407. Based on the size indicated by the UL control message 451, scheduling information may be included in the scheduling grant 456. By not requiring communication of the scheduling request from the UE 102 to the BS 101 prior to communicating the data 407 at 5017 and after network access at 5014, the latency until transmission of the data 407 is further reduced.

If the network and specifically the BS 101 already has knowledge on the predicted size of the data 407—which may, in particular, apply for scenarios where the data is DL data—, it is not required that the UL control message 451 is indicative of the size.

FIG. 8 illustrated a scenario in which the scheduling grant 456 is transmitted at 5066. In other examples, it would be possible that the DL control message 452 already includes scheduling information for a further reserved resource used for the data transmission 407 at 5017. This further decreases latency.

FIG. 8 is a scenario where UE mobility does not occur while operating the UE 102 in the idle mode 304. However, scenarios are conceivable where UE mobility occurs while operating the UE 102 in the idle mode 304. Such a scenario is illustrated in connection with FIG. 10.

Figure 10:
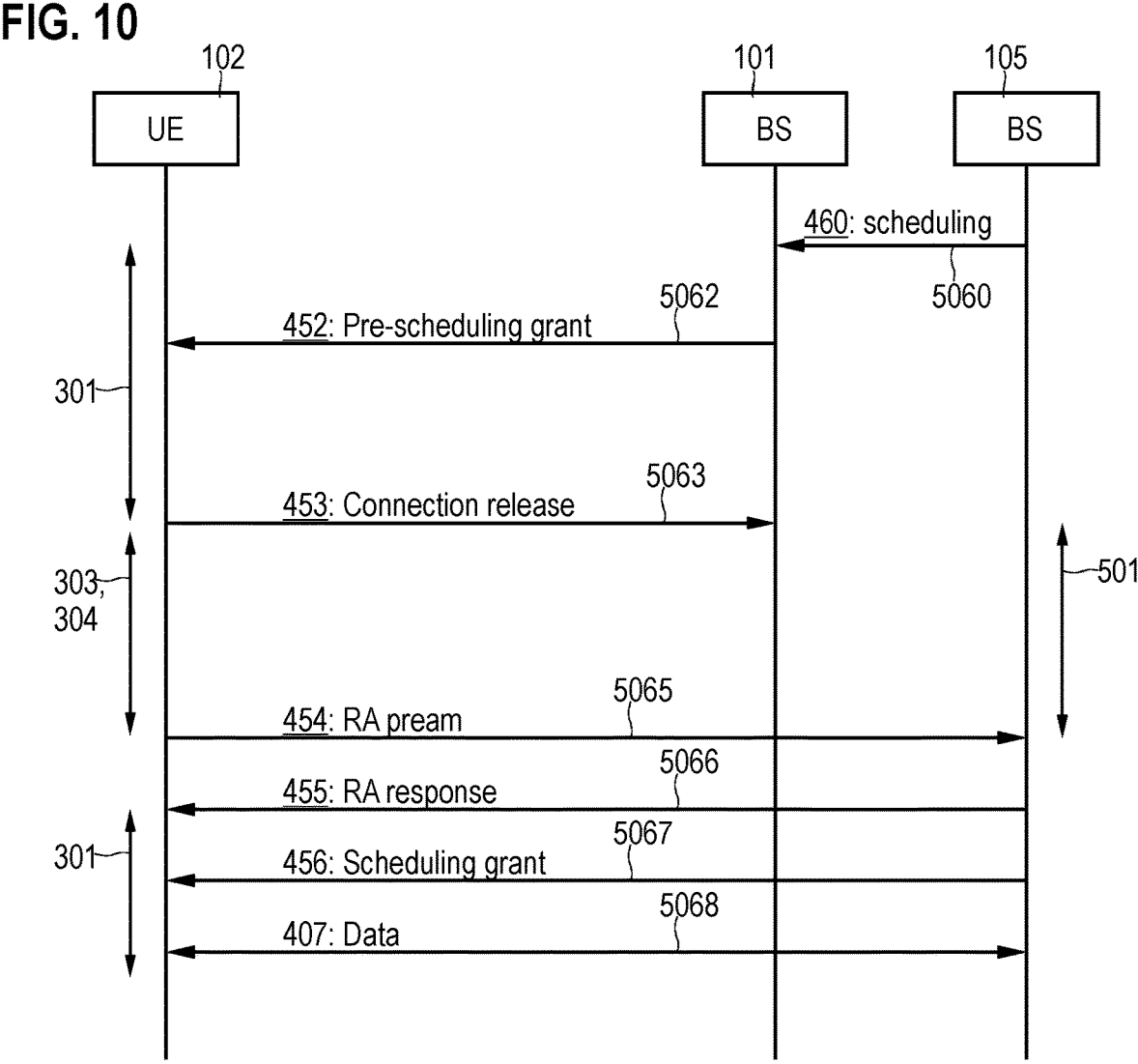
FIG. 10 is a signalling diagram of communication between the UE and the BS and a further BS and illustrates using reserved resources for performing a network access prior to communicating data according to various examples.

FIG. 10 is a signaling diagram illustrating communication between the UE 102 and the BS 101. The signaling diagram of FIG. 10 also illustrates communication between the UE 102 and the BS 105. The BSs 101, 105 are associated with different cells of the cellular network 100.

The scenario FIG. 10 generally corresponds to the scenario FIG. 8. However, in the scenario FIG. 10, UE mobility occurs while operating the UE 102 in the idle mode 304. In other words, the UE 102 moves from the cell associated with the BS 101 to the cell associated with the BS 105. Sometimes, this may refer to the UE 102 initially camping on the cell associated with the BS 101; and then camping on the cell associated with the BS 105.

To account for this mobility, at 5060, a scheduling control message 460 is transmitted by the BS 105 and received by the BS 101. The scheduling control message 460 is indicative of the timing of a reserved resource, wherein the resource is reserved by the BS 105. For example, it would be possible that the scheduling control message 460 already includes scheduling information to be then included in the DL control message 452 transmitted at 5062. Generally, 5062 can correspond to 5012. In addition to an indication of the timing 501, it would be possible that the DL control message 452 also includes identity information—e.g., a unique cell identifier—associated with the sale of the BS 105. Therefore, the UE 102 can be informed which particular BS 105 provides for the reserved resource associated with the timing indicated in the DL control message 452.

The BS 101 may or may not reserve the same resource also reserved by the BS 105.

5063 generally corresponds to 5013. Here, the data connection 160 between the UE 102 and the network 100 via the cell associated with the BS 101 is released. Then, UE mobility occurs. The UE 102 moves into the coverage of the cell associated with the BS 105.

Then, at 5065, the network access 454 is performed including transmission of a preamble sequence by the UE 102 to the BS 105. The BS 105 responds at 5066 with the RA response message 455 such that subsequently the data connection 160 is established between the UE 102 and the network 100 via the cell associated with the BS 105.

Hence, also the communication of the RA preamble 455 at 5065 from the UE 102 to the BS 105 can be prioritized, as has been explained above in connection with FIG. 8. 5066 corresponds to 5015. 5067 corresponds to 5016. 5068 corresponds to 5017.

As will be appreciated from FIG. 10, here, no UL control message 451 is communicated from the UE 102 to the BS 101 using the data connection with the network 100 prior to 5062. However, it would be possible that the UL control message 451 is communicated from the UE 102 to the BS 101. Then, any information included in that UL control message 451—which may generally correspond to the UL control message 451 as discussed above in connection with FIG. 8—may be forwarded by the BS 101 to the BS 105. The BS 105 may then determine the timing indicated by the scheduling control message 460 based on such information forwarded by the BS 101.

Figure 11:
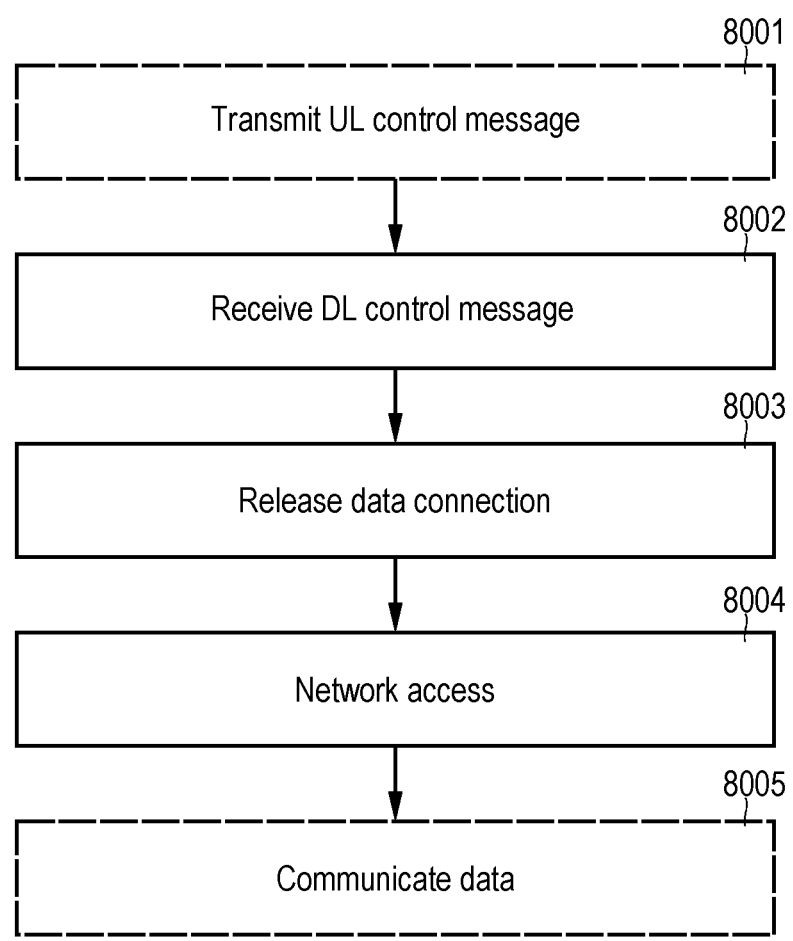
FIG. 11 is a flowchart of a method according to various examples.

FIG. 11 is a flowchart of a method according to various examples. For example, the method according to FIG. 11 could be executed by the control circuitry of the UE 102, i.e., the processor 1021 in combination with the memory 1025. For example, program code could be loaded by the processor 1021 from the memory 1025 (cf. FIG. 2).

Execution of the program code by the processor 1021 can cause the processor 1021 to perform the method according to the example of FIG. 11. In FIG. 11, dashed lines illustrate optional blocks.

Initially, at optional block 8001, an UL control message is transmitted. For example, the UL control message 451 according to the example of FIG. 8 could be transmitted. The UL control message may be referred to as a pre-scheduling request, because it may include information on a timing of a predicted future data transmission. As such, the UL control message may be a request for one or more reserved resources for a network access in accordance with the timing, to thereby timely establish a data connection by means of the network access for facilitating the data transmission.

Optionally, the UL control message may also include an indicator indicative of the size of the data of the subsequent data transmission and/or an indicator indicative of the directivity—UL and/or DL—of the subsequent data transmission. Such optional information may facilitate scheduling of the subsequent data transmission; for example, another scheduling request may not be required (cf. FIG. 8 where an additional scheduling request is not required between the network access 454 at 5014 and the scheduling grant 456 at 5016).

Next, at block 8002, a DL control message is received. For example, the DL control message 452 according to the example of FIG. 8 could be received. The DL control message may be referred to as pre-scheduling grant, because it may include an indicator indicative of a timing of a reserved resource for a network access. Specifically, it would be possible that the timing corresponds to scheduling information which explicitly identifies the reserved resources in time domain and/or frequency domain and/or code domain and/or space domain. For example, the timing may be implemented by a scheduling information which explicitly identifies a specific time-frequency resource element of a resource grid. For example, the scheduling information may include an indicator identifying a preamble sequence to be used during the network access. The timing may, alternatively or additionally, be indicative of a point in time at which the resource is reserved. As such, it would be possible that the timing includes a sequence number of the transmission frame or an initialization value for a timer to countdown until the point in time at which the resource is reserved.

When executing blocks 8001, 8002, the respective UE may be in connected mode (cf. connected modes 301, 302 of FIG. 4). Hence, a data connection may be established. Then, at block 8003, this data connection used for communicating the DL control message at block 8002 and optionally the UL control message at 8001, is released. This may include Layer 2 or Layer 3 control signaling, e.g., a Radio Resource Control (RRC) connection release message in the 3GPP LTE framework. As such, block 8003 may correspond to a transition into an idle operational mode (cf. idle modes 303, 304 of FIG. 4).

At block 8004, network access is performed. This may include establishing a further data connection (cf. FIG. 3, data connection 160) with the network. Network access may include random access. Here, contention-based or non-contention-based network access is generally possible, depending on whether the resource is reserved semi-exclusively or exclusively. As such, block 8004 may correspond to a transition into a connected mode (cf. connected modes 301, 302 in FIG. 4).

In between blocks 8003 and 8004, the receiver of the respective UE may be continuously, persistently, and contiguously operated in an inactive state (cf. inactive state 383 of FIG. 5) in which it is unfit to receive data. Alternatively, a DRX cycle would be possible. The UE may or may not be pageable, depending on the desired balance between scheduling flexibility, and energy savings.

As a general rule, by providing the reserved resource, a likelihood of collision and subsequent backup during the network access at block 8004 can be reduced if compared to scenarios where no specifically reserved resource is provided. Therefore, latency and reliability can be increased. The reserved resource may block access by at least one further UE.

Finally, at block 8005, the data transmission is implemented. For example, at block 8005, DL data received and/or UL data may be transmitted using the data connection established at block 8004 in connection with the network access.

The data transmission at block 8005 can be implemented using a resource indicated by a scheduling grant. For example, a dedicated scheduling grant may be received between blocks 8004 and 8005 (cf. FIG. 8, scheduling grant 456); alternatively, it would be possible that the DL control message received that block 8002 already includes respective scheduling information.

Figure 12:
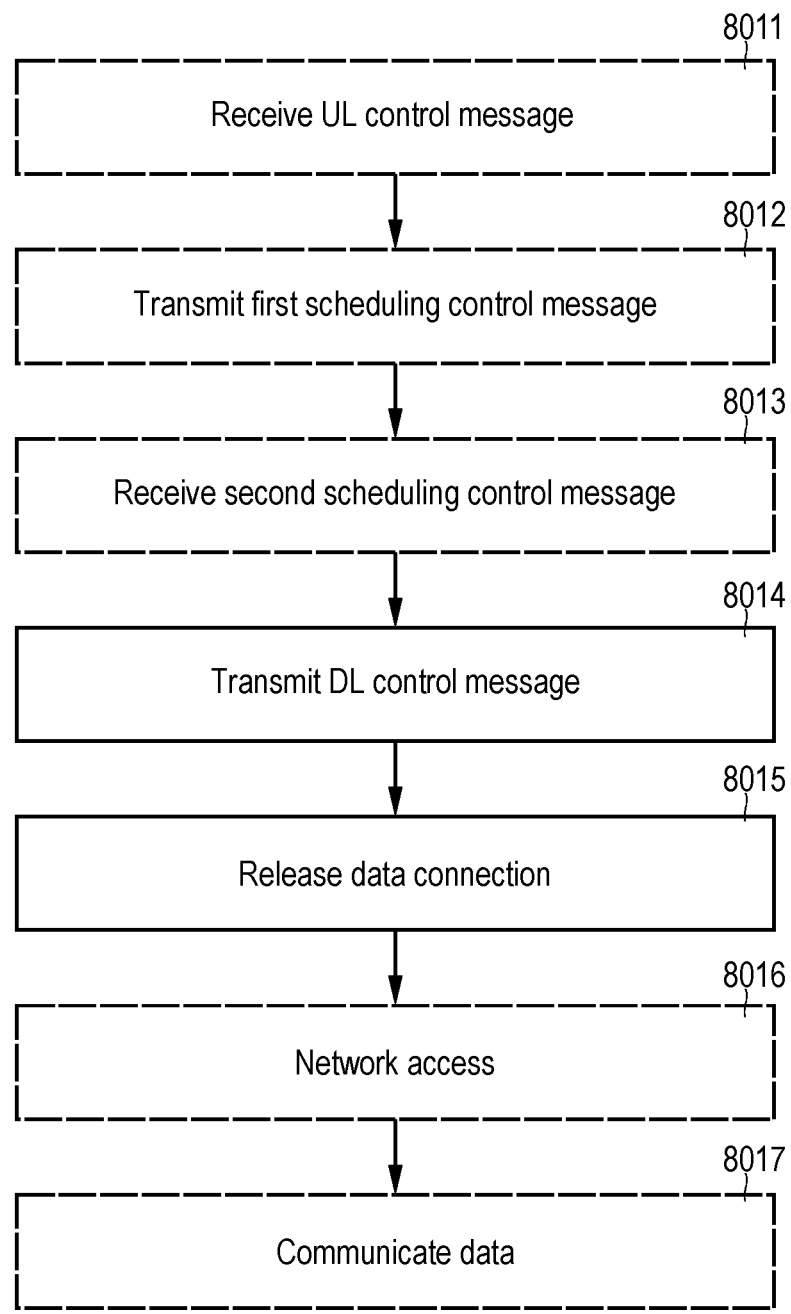
FIG. 12 is a flowchart of a method according to various examples.

FIG. 12 is a flowchart of a method according to various examples. For example, the method according to FIG. 12 could be executed by the control circuitry of the BS 101, i.e., the processor 1011 in combination with the memory 1015 (cf. FIG. 2). For example, program code could be loaded by the processor 1011 from the memory 1025. Execution of the program code by the processor 1011 can cause the processor 1011 to perform the method according to the example of FIG. 12. In FIG. 12, dashed lines illustrate optional blocks.

At optional block 8011, an UL control message is received. Block 8011 is inter-related with block 8001.

Next, at block 8012, again an optional block, a first scheduling control message is transmitted. For example, the first scheduling control message may be transmitted to one or more base stations, e.g., associated with neighboring cells. The first scheduling control message may include information provided with the UL control message received at block 8011: such information may include information on the timing associated with the future data transmission, information on the size of the data transmission, and/or information on the directivity of the data transmission. For example, it would also be possible that the first scheduling control message includes an identity of the UE from which the UL control message is received at block 8011 and/or an identity of the user associated with the UE.

Next, at block 8013, again an optional block, a second scheduling control message is received (e.g., the second scheduling control message may correspond to the scheduling control message 460 of FIG. 10). For example, the second scheduling control message may be received from at least one of the one or more base stations to which the first scheduling control message has been transmitted at block 8012.

Specifically, the second scheduling control message received at block 8013 may be in response to the first scheduling control message transmitted at block 8012.

The scheduling control message may include information later on included in the DL control message transmitted at block 8014. Block 8014 as inter-related with block 8002. As such, the second scheduling control message received at block 8013 may include an indicator indicative of the timing of a resource reserved by the respective base station from which the second scheduling control message is received at block 8013.

At 8015, the data connection via which the DL control message has been transmitted at 8014 and via which, optionally, the UL control message has been received at block 8011 is released. Block 8015 as inter-related with block 8003.

Optional block 8016 corresponds to block 8004. Optional block 8017 corresponds to block 8005.

Summarizing, above techniques of indicating the timing of an intended future data transmission have been disclosed. Specifically, techniques of prioritizing network access by a UE have been disclosed, for facilitated the data transmission. This is achieved, according to various examples, by communicating a DL control message indicative of a timing of a reserved resource for the network access. For example, the timing may correspond to a timestamp which is associated with the reserved resource. The timing may include a transmission frame number or a timer value, etc. Optionally, the DL control message may include information on the reserved resource, i.e., may include scheduling information. The scheduling information may be indicative of a time-frequency resource element of a resource grid. Optionally, the DL control message may be indicative of a size of the intended data transmission and/or of a directivity of the intended data transmission. For example, the various scenarios described herein, the size may be expressed in terms of resource elements or in terms of bytes. Optionally, the DL control message may include a cell identity associated with the particular cell on which a resource is reserved for the network access. This may help to address UE mobility scenarios.

The DL control message may be transmitted as a response, e.g., in response to an UL control message; or may be network-initiated. For example, the intended size of the data transmission and/or the timing of the intended data transmission and/or the directivity (of the intended data transmission may be requested by the UE by means of the UL control message.

In response to receiving the DL control message, the UE may then continue communication and, eventually, enter idle mode. Legacy procedures for transitioning into idle mode may be employed, e.g., implementing inactivity timers, etc. In accordance with the timing indicated by the DL control message, the UE is expected to perform the network access using the reserved resource. Here, a non-contention-based access procedure may be employed, based on the reserved resource. Once a data connection has been again established, data may be scheduled for UL and/or DL transmission. This scheduling may be based on the size previously indicated in the UL control message and/or the DL control message. This makes it unnecessary to transmit further scheduling requests from the UE to the network. For transmitting the scheduling information for the data, it is generally possible to employ legacy procedures.

Such techniques as presented above enable tailoring the application response time while enabling the UE to operate its interface in an inactive state between subsequent data transmissions. A tailored balance between application response latency and UE energy consumption may be achieved.

Such techniques may be in particular applied to battery-powered IOT devices where the size of the individual data transmission is comparably small and the time to wait for responses is comparably long such that transition into idle mode is warranted.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above various scenarios have been described in the context of a 3GPP LTE network, similar techniques may be readily applied in the context of a 3GPP NR network or another kind or type of network.

The invention claimed is:

1. A method, comprising:
using a first data connection between a network and a terminal: communicating, from a network node of the network to the terminal, a downlink control message indicative of a timing of a reserved resource reserved for communication between the network and the terminal, the reserved resource being dimensioned based on a predicted size of a data transmission predicted by the network,
performing a connection release of the first data connection, and
in accordance with the timing and using the reserved resource: performing a network access to establish a second data connection between the terminal and the network.

2. The method of claim 1,
wherein the timing comprises scheduling information indicative of the reserved resource defined in at least one of time domain, frequency domain, and code domain.

3. The method of claim 2,
wherein the scheduling information is indicative of a preamble sequence for the network access.

4. The method of claim 1,
wherein the scheduling information is indicative of a time-frequency resource element of a resource grid,
wherein a preamble sequence is communicated in the time-frequency resource element.

5. The method of claim 1,
wherein the timing comprises at least one of a sequence number of at least one transmission frame of a radio link of the network comprising the reserved resource, and a timer initialization value for a timer implemented by the terminal.

6. The method of claim 1,
wherein the terminal is registered with the network as un-pageable in-between the connection release and the network access.

7. The method of claim 6,
wherein the terminal is registered as un-pageable for at least 15 seconds, optionally for at least 60 seconds, further optionally for at least 10 minutes.

8. The method of claim 1, further comprising:
predicting a timing of a data transmission,
determining the timing of the reserved resource based on said predicting of the timing of the data transmission, and in response to performing the network access and using the second data connection: performing the data transmission.

9. The method of claim 8,
wherein the timing of the data transmission is predicted based on at least one of a packet data network response time and a repetitive reporting schedule of an application executed by the terminal.

10. The method of claim 1, further comprising:
using the first data connection: communicating, from the terminal to the network node, an uplink control message for requesting the downlink control message, the uplink control message being indicative of the timing of the reserved resource.

11. The method of claim 10,
wherein the downlink control message comprises an acknowledgement of the timing indicated by the uplink control message.

12. The method of claim 8, further comprising:
using the first data connection: communicating, from the terminal to the network node, an uplink control message for requesting the downlink control message, the uplink control message being indicative of the timing of the reserved resource; and
wherein the uplink control message is further indicative of a size of the data transmission and optionally of a directivity of the data transmission.

13. The method of claim 12,
wherein the data transmission is an uplink data transmission,
wherein the method further comprises:
in response to said establishing of the second data connection:
communicating, from the network node to the terminal, a further downlink control message comprising scheduling information indicative of a further reserved resource, the size of the further reserved resource being in accordance with the size of the data transmission indicated by the uplink control message,
wherein the uplink data transmission is performed using the further reserved resource.

14. The method of claim 13, further comprising:
not communicating an uplink scheduling request from the terminal to the network node in-between said performing of the network access and said performing of the uplink data transmission.

15. The method of claim 1,
wherein the downlink control message comprises identity information associated with a cell of a plurality of cells of the network which reserves the resource.

16. The method of claim 1,
wherein the first data connection is via a first cell of a plurality of cells of the network,
wherein the second data connection is via a second cell of the plurality of cells of the network.

17. The method of claim 1, further comprising: in between said performing of the connection release and said performing of the network access: continuously operating a receiver of the terminal in an inactive state.

18. The method of claim 1,
wherein the network access is performed non-contention-based using the reserved resource.

19. The method of claim 1,
wherein the downlink control message comprises further scheduling information indicative of a further reserved resource,
wherein the method further comprises:
transmitting data using the second data connection and using the further reserved resource.

20. A device comprising control circuitry configured to perform:
using a first data connection between a network and a terminal: communicating, from a network node of the network to the terminal, a downlink control message indicative of a timing of a reserved resource reserved for communication between the network and the terminal, the reserved resource being dimensioned based on a predicted size of a data transmission predicted by the network,
performing a connection release of the first data connection, and in accordance with the timing and using the reserved resource: performing a network access to establish a second data connection between the terminal and the network.

* * * * *